United States Patent Office 2,877,259
Patented Mar. 10, 1959

2,877,259
DI-(ALKYL)-MONO-(ALKYLPHENYL)-PHOSPHITES

John C. Bill, Middlebury, Conn., assignor to United States Rubber Company, New York, N. Y., a corporation of New Jersey No Drawing. Application September 10, 1954
Serial No. 455,366

3 Claims. (Cl. 260—461)

This invention relates to a new class of stabilizers for synthetic rubbers, such as the synthetic rubbery conjugated diene polymerizates as exemplified by GR–S. These new stabilizers are effective against deterioration due to heat or light, and further they have a lessened tendency to hydrolyze in an aqueous system. Such useful combined features are not possessed by the organic phosphites as a class. The present stabilizers subscribe to the formula

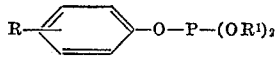

where R and $R^1$ are each an alkyl group containing from 8 to 12 carbon atoms.

These compounds may be added in a small proportion, usually, of 0.1 to 5% by weight, to the rubber either in the latex phase or on the mill. Being soluble in organic solvents, e. g., benzene or ligroin, they disperse readily in the rubber. They do not adversely affect the rate of vulcanization nor do they impart a discoloration on long standing. Further, they possess sufficient resistance to hydrolysis so that they can be added to the GR–S at the latex stage, prior to coagulation, without danger of decomposition.

Examplary of this invention are the following chemicals:

Di-(dodecyl)-mono-(nonyl phenyl)-phosphite
Di-(octyl)-mono-(octyl phenyl)-phosphite
Di-(decyl)-mono-(nonyl phenyl)-phosphite
Di-(dodecyl)-mono-(nonyl phenyl)-phosphite
Di-(nonyl)-mono-(decyl phenyl)-phosphite
Di-(nonyl)-mono-(dodecyl phenyl)-phosphite These compounds have been made by the process of treating the proper alkyl-substituted phenol with an excess of phosphorus trichloride, followed by a removal of the excess phosphorous trichloride and distillation of the alkylaryloxy phosphorus dichloride under vacuum. The distillate is then treated with two moles of an alcohol in the presence of two moles of a sequestering agent, such as pyridine.

(A)
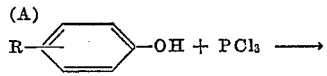

(B)
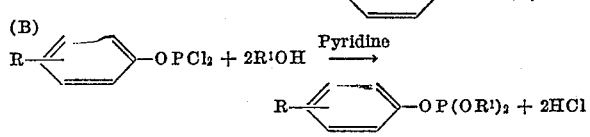

(R and $R^1$ are the alkyl groups)

Examples illustrative of the invention are as follows:

*Example 1.—Nonyl phenoxy phosphorus dichloride*

Phosphorus trichloride (2250 gms., 16.5 mol.) was placed in a five liter, three-necked flask equipped with stirrer, addition funnel and a reflux condenser surmounted by a drying tube. At room temperature, nonyl phenol (1101.7 gms., 5 mol.) was added over the course of three hours. The reaction mix was then allowed to stand eighteen hours. The excess phosphorus trichloride was removed under water vacuum (pot temp. 70° C./25 mm.) and the residue was then fractionally distilled.

| Fraction | Pressure Volume, mm. | Heat Temperature, °C. | Weight, gms. |
|---|---|---|---|
| 1 | .7–.4 | 104–147 | 83 |
| 2 | .4 | 147 | 8 |
| 3 | .4–.5 | 147–159 | [1] 620 |
| 4 | .7 | 139–156 | [1] 428 |
| 5 | .7 | 156–172 | 22 |
| 6 | .7 | 172–177 | 25 |

[1] Nonylphenoxy phosphorus dichloride.

*Example 2.—Di-(dodecyl)-mono-(nonyl phenyl) phosphite*

Nonylphenoxy phosphorus dichloride (fractions 3–4) (75 gms., .234 mol.) was dissolved in 100 cc. of anhydrous ether in a 500 cc. three-necked flask equipped with addition funnel, stirrer, pot thermometer and reflux condenser with drying tube. To this solution, a solution of dodecyl alcohol (89.3 gms., .48 mol.), pyridine (38 gms., .48 mol.) and absolute ether (100 cc.) was added with good stirring. After the addition was complete the reaction mixture was stirred for three hours at room temperature and filtered. The filtrate was washed three times with 100 cc. portions of water containing 5% hydrochloric acid and dried with sodium sulfate. It was then topped to 80° C./33 mm.

Calcd. for $C_{39}H_{73}O_3P$: P, 4.99. Found: P, 5.08.

*Example 3.—Di-(2-octyl)-mono-(nonyl phenyl)-phosphite*

A mixture of 2-octanol (83 gms., .637 mol.) and pyridine (50 gms., .633 mol.) was added dropwise to a solution of nonylphenoxy phosphorus dichloride (100 gms., .313 mol.) in absolute ether (100 cc.). The mixture was filtered, washed with two 100 cc. portions of water and dried over anhydrous sodium sulfate. The liquid was then topped to 200° C./2 mm. There remained a yellow oil.

Calcd. for $C_{33}H_{57}O_3P$: P, 6.22. Found: P, 6.68; $n_D^{20}$ 1.4821.

These chemicals are shown to stabilize the copolymer of butadiene and styrene (GR–S) as follows: The chemicals were added to GR–S latex in the proportion by weight of 1.0 part per 100 parts rubber. The latex was flocculated, washed, and dried and aged at 130° C. The time-recorded period required for deterioration to be evident on manual examination was as follows, Resinification time at 130° C. (hrs.)—
 1. Di(2-octyl)-mono-(nonyl phenyl)-phosphite_ 17
 2. Di-(dodecyl)-mono-(nonyl phenyl)-phosphite 13
 3. Di-(2-octyl)-mono-(phenyl)-phosphite _____ 5
 4. Blank _____ 1

It will be observed, from comparing test 3 with test 1, that absence of the nonyl substituent in the phenyl group adversely lowers the efficiency of the chemical.

Other chemicals falling within the scope of this invention are:

Di-(nonyl)-mono-(nonyl phenyl)-phosphite
Di-(undecyl)-mono-(nonyl phenyl)-phosphite
Di-(nonyl)-mono-(octyl phenyl)-phosphite
Di-(nonyl)-mono-(undecyl phenyl)-phosphite While the invention has been described with particular reference to the rubbery copolymers of butadiene and styrene, it is also applicable to the copolymers of other dienes such as isoprene, 2,3-dimethyl butadiene, 2,3-diethyl butadiene, chloroprene, with styrene, alpha-methyl styrene, p-chloro styrene, 2-vinyl pyridine, 2-methyl 5-vinyl pyridine, methyl acrylate, ethyl acrylate, methyl methacrylate, vinyl carbazole, etc.

Finished rubber stocks made from the vulcanization of these phosphite-stabilized rubbers are satisfactory with respect to the usual physical properties such as tensile, flexibility, abrasion resistance, etc.

Having thus described my invention, what I claim and desire to protect by Letters Patent is:

1. Compounds represented by the formula

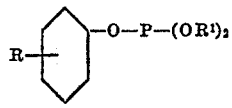

where R and $R^1$ are each an alkyl group containing from 8 to 12 carbon atoms.

2. Di-(2-octyl)-mono-(nonyl phenyl)-phosphite.
3. Di-(dodecyl)-mono-(nonyl phenyl)-phosphite.

References Cited in the file of this patent
UNITED STATES PATENTS

| | | |
|---|---|---|
| 2,121,611 | Salzberg | June 21, 1938 |
| 2,226,552 | Conary et al. | Dec. 31, 1940 |
| 2,227,985 | Swan | Jan. 7, 1941 |
| 2,408,744 | Engel | Oct. 8, 1946 |
| 2,493,390 | Chaban | Jan. 3, 1950 |